UNITED STATES PATENT OFFICE.

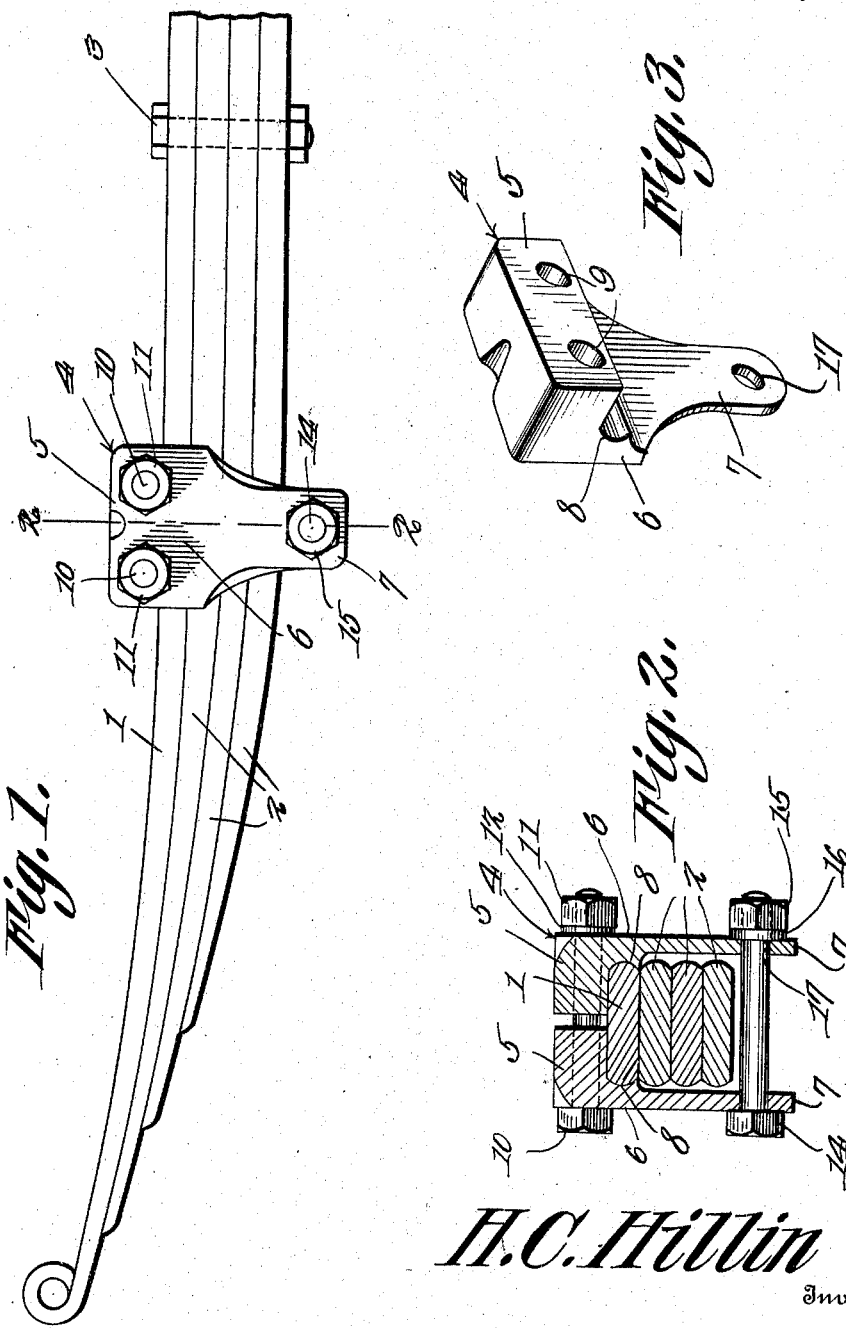

HARRY C. HILLIN, OF EL PASO, TEXAS.

ADJUSTABLE SPRING-CLAMP.

1,303,557.  Specification of Letters Patent.  Patented May 13, 1919.

Application filed October 20, 1917. Serial No. 197,668.

*To all whom it may concern:*

Be it known that I, HARRY C. HILLIN, a citizen of the United States, residing at El Paso, in the county of El Paso and State of Texas, have invented a new and useful Adjustable Spring-Clamp, of which the following is a specification.

It is the object of this invention to provide a clamp which is adapted to be assembled with a vehicle spring for the purpose of preventing undue lateral movement between the leaves of the spring, and for the purpose of limiting the backlash in the spring, the clamp being so constructed that it will grip the main or top leaf of the spring, without gripping the auxiliary or lower leaves of the spring.

The drawings show merely a typical embodiment of the invention, and it is to be understood that, within the scope of what is claimed, changes falling within the skill of a mechanic may be made without departing from the spirit of the invention.

In the drawings:—Figure 1 shows in side elevation, a portion of a spring to which the clamp hereinafter described has been applied; Fig. 2 is a cross section on the line 2—2 of Fig. 1; Fig. 3 is a perspective view showing one member of the clamp.

In the drawings there is shown one end of a vehicle spring comprising a main leaf 1 and any desired number of auxiliary leaves 2 united by a connection 3. The clamp forming the subject matter of this application comprises a pair of identical members 4 each including a body 5, a depending arm 6 disposed at right angles to the body, and a finger 7 projecting from the arm 6, the finger preferably being tapered and being somewhat thinner than the arm. In the inner face of the arm 6 an outwardly concaved seat 8 is formed. The body 5 has transverse openings 9 therethrough. A pair of members constructed as above described are mounted on the vehicle spring as shown in Fig. 2, the bodies 5 of the clamp members resting on top of the main leaf 1, the edges of the main leaf being received in the seats 8, and the fingers 7 extending downwardly along the sides of the auxiliary leaves 2 in spaced relation thereto. Bolts 10 are inserted through the openings 9 and the nuts 11 on the bolts are held in place, if desired, by lock washers 12. A bolt 14 is passed through openings 17 in the lower ends of the fingers 7, and the nut 15 on the bolt 14 may be held in place by a lock washer 16. When the bolts 10 are tightened up, the upper leaf 1 of the spring is gripped firmly in the seats 8. The auxiliary leaves 2, however, are not gripped, since the fingers 7 are spaced from the edges of the auxiliary leaves as shown in Fig. 2. The spring, therefore, can operate in the usual way, but undue lateral movement between the constituent leaves of the spring cannot take place, the bolts 14 being effective to prevent back-lash. Since the main leaf 1 is gripped in the seats 8 the structure may be used to advantage when the main leaf is broken, it being possible to hold the parts of a broken main leaf firmly in the seats 8 by tightening up the bolts 10. But one of the clamps forming the subject matter of this application is shown mounted on the spring in Fig. 1, but it will be understood that as many clamps as desired may be carried by the spring, depending upon the length of the spring and the duty which the spring is called upon to perform. The length of the finger 7 will be determined by the number of auxiliary leaves in the spring, and the dimensions of the body 5 will be regulated by the width of the leaves of the spring.

Having thus described the invention what is claimed is:—

A clamp for leaf springs, comprising opposed members including parallel arms provided at their upper ends with bodies disposed approximately at right angles to the arms and extended toward each other, the inner ends of the bodies being spaced slightly apart, the bodies being thicker than the arms, the arms being thickened immediately below the bodies, the thickened portions of the arms having concaved seats on their inner surfaces, the inner surfaces of the arms below the thickened portions thereof being spaced more widely apart than are the seats; a connecting device detachably uniting the lower ends of the arms; and a connecting device passing through the bodies and uniting said members.

In testimony that I claim the foregoing as my own, I have hereto affixed my signature in the presence of two witnesses.

HARRY C. HILLIN.

Witnesses:
PHILOMENA A. ROCKELLI,
MASON B. LAWTON.

Copies of this patent may be obtained for five cents each, by addressing the "Commissioner of Patents, Washington, D. C."